United States Patent [19]

Honjo et al.

[11] 4,405,685

[45] Sep. 20, 1983

[54] CARBON FIBERS WITH DUPLEX METAL CARBIDE COATING AND METHODS FOR MANUFACTURE THEREOF

[75] Inventors: Kuniaki Honjo, Ikeda; Akio Shindo, Kawanishi, both of Japan

[73] Assignee: Agency of Industrial Science & Technology, Ministry of International Trade & Industry, Tokyo, Japan

[21] Appl. No.: 319,911

[22] Filed: Nov. 10, 1981

[30] Foreign Application Priority Data

Nov. 13, 1980 [JP] Japan ............................... 55/160606
Aug. 19, 1981 [JP] Japan ............................... 56/130515

[51] Int. Cl.³ .................... B32B 9/04; B32B 33/00; D02G 3/02
[52] U.S. Cl. .................... 428/368; 427/255.2; 427/255.7; 427/419.7
[58] Field of Search ............ 428/368; 427/255.2, 427/255.7, 419.7

[56] References Cited

U.S. PATENT DOCUMENTS

| | | | |
|---|---|---|---|
| 3,788,893 | 1/1974 | Morelock | 428/368 |
| 3,811,920 | 5/1974 | Galasso et al. | 428/368 |
| 3,969,130 | 7/1976 | Bokros | 428/368 |
| 4,068,037 | 1/1978 | Debolt et al. | 428/368 |
| 4,168,337 | 9/1979 | Maistre | 428/368 |
| 4,201,611 | 5/1980 | Stover | 428/368 |
| 4,257,835 | 3/1981 | Bompard | 428/368 |
| 4,278,729 | 7/1981 | Gibson et al. | 428/368 |
| 4,328,272 | 5/1982 | Maistre | 428/368 |
| 4,340,636 | 7/1982 | DeBolt et al. | 428/368 |
| 4,373,006 | 2/1983 | Galasso et al. | 428/368 |

FOREIGN PATENT DOCUMENTS

32858  7/1981  European Pat. Off. ............ 428/368

OTHER PUBLICATIONS

Preprints of the 1980 meeting of Japan Ceramic Society, p. 39 (May 15, 1980).

*Primary Examiner*—James C. Cannon
*Attorney, Agent, or Firm*—Oblon, Fisher, Spivak, McClelland & Maier

[57] ABSTRACT

A carbon fiber coated with a duplex film consisting of an inner-layer film formed of a mixture of free carbon and metal carbide and an outer-layer film formed substantially of metal carbide.

10 Claims, No Drawings

CARBON FIBERS WITH DUPLEX METAL CARBIDE COATING AND METHODS FOR MANUFACTURE THEREOF

BACKGROUND OF THE INVENTION

This invention relates to a carbon fiber coated with a duplex film and to a method for the manufacture thereof.

Carbon fiber-reinforced plastics using high-strength, high-modulus carbon fibers as reinforcements are widely used in medical apparatuses, space and aeronautic vessels, land transportation machines, sports gear, etc. as structural materials having excellent mechanical properties such as high tensile strengths and Young's modulus. They, nevertheless, have a disadvantage to be deficient in thermal resistance because of the property of the plastics being used as matrix material. Then, to develop a composite material which excels in thermal resistance as well as in specific strength and specific elastic modulus studies are now under way on the use of metals or ceramics as a matrix for the composite material. Carbon fibers, however, when contact with metals or ceramics at high temperatures, tend to react with them to be heavily degraded in strength. Consequently, the composite material obtained can only acquire strength much lower than the expected level.

In order to prevent such reactions of carbon fiber with matrix materials as mentioned above or air, studies are also under way on coating ceramics such as silicon carbide and titanium carbide on carbon fibers. Such a coating is also supposed to improve the wetting ability of the carbon fiber surface to metal matrix.

In many cases such a coating tends to degrade the strength of carbon fibers by about 50% of before coating. This degradation seriously destroy the expected reinforcing effect of the carbon fiber. This degradation is considered to be due to the formation of faults such as grain boundaries playing a role as initiation points of rupture, and due to the tensile stress occurred and remained in the coatings after processing because of the difference in thermal expansion coefficient between the coating materials and the carbon fibers.

It also was found by the present inventors that when films of substantially sole SiC was coated on the carbon fibers, the strength of the coated fiber was reduced to 60% that of the original uncoated fiber. And it was suggested by them that a carbon fiber coated with a carbon riched SiC layer and SiC layer can possess a little higher strength than 60% that of the original fiber. After many investigations under various conditions, they have found that the selection of the appropriate composition and thickness is necessary for the production of much stronger carbide coated carbon fibers which maintain the strength before coating. They also have found that the structure and texture of the free carbon embedded in the film is essential for this strengthening effect of the carbon riched layer.

SUMMARY OF THE INVENTION

An object of this invention is to provide metal carbide duplex-film coated carbon fibers which exhibit improved specific strength and specific elastic modulus and are stable to metals, ceramics and air at high temperatures. Another object of this invention is to provide a method for manufacturing of this carbon fiber.

The duplex-film coated carbon fiber according to the present invention comprises a carbon fiber and a duplex film coated on the carbon fiber. This duplex film consists of an inner-layer film in which free carbon and covalent metal carbide or interstitial metal carbide are mixed and an outer-layer film of metal carbide containing no free carbon. By interpositioning the film of the mixture of free carbon and metal carbide between the carbon fiber and the metal carbide film which is served as a protection film for the carbon fiber, the otherwise possible reaction of the carbon fiber with the matrix is precluded and the occurrence of residual stress due to the difference in thermal expansion coefficient between the carbon fiber and metal is alleviated.

The other objects and characteristics of this invention will become apparent from the further disclosure of the invention to be made herein below.

DESCRIPTION OF PREFERRED EMBODIMENTS

Methods for coating carbon fibers with metal carbides for the purpose of protecting the carbon fiber from the degradation by metal at high temperatures have been proposed. The coating treatments involved in such methods have markedly lowered the strength of the carbon fiber itself. Then, the inventors carried out research and experiments to develop a method which permits coating the carbon fiber without adversely affecting the strength of the carbon fiber. They have consequently found that when the carbon fiber is coated with a duplex film which composed of an inner-layer film consisting substantially of metal carbide and free carbon with graphite layer parallel to the surface of the fiber and an outer-layer film of metal carbide, the carbon fiber retains its high strength and, at the same time, acquires high resistance to the corrosive reactions with the matrix metal. This discovery has led to the present invention.

The term "carbon fiber" in the present specification implies both carbonized and graphitized organic fibers. And these carbon fibers used in this invention can be made from various organic fibers such as polyacrylonitrile, rayon, pitch, mesophase pitch or the like. However, a carbon fiber produced at a temperature above 1000° C. is recommended to be used in this invention. Furthermore, carbon fibers having strength exceeding 180 Kg/mm$^2$ are recommendable as a starting material in this invention. As a form of the carbon fiber, a yarn of bundle or sheet of uniaxially alligned endless filaments, composed of for example 1000–15000 filaments is recommendable. The content of free carbon contained in the inner-layer film is desirable to be in the range of 95 to 5 weight precent but more desirable to be from 80 to 5.

By such an inner-layer, the propagation of cracks initiated in the outer-layer is inhibited and hence the strength before coating of high strength carbon fiber can be retained in the coated fiber. Lower carbon content than 5 percent should be avoided because the ability to inhibit the propagation of cracks from the outer-layer is extremely reduced in such an inner-layer film. When the content is higher than 95 percent, higher strength can not be attained, because the adhesion of the outer-layer to this inner-layer in such a composition is not so good. Moreover, by carefully selecting the composition of the inner-layer, the thermal coefficient difference between the carbon fiber and the inner-layer or the inner-layer and the outer layer can be minimized. This leads to the depression of the residual stress in the outer carbide layer. Hence, when the coating conditions are proper, the coated carbon fiber is to acquire even greater strength than that of the uncoated original carbon fiber.

The metal carbide coated on the carbon fiber is to protect the carbon fiber from the matrix metal at high temperatures. Accordingly, it is required to be hardly reactive with aluminum, magnesium, alloys formed preponderantly of such metals, or nickel. The metal carbide which fulfills this requirement is a covalent carbide or a interstitial carbide. Concrete examples of the metal carbide include carbides of silicon, boron, titanium, zirconium, niobium, tungsten, tantalum, and mixtures of such carbides. The outer-layer film can be a mixture of the metal carbide and the corresponding elemental metal.

Both the inner- and outer-layers in the duplex film in this invention can be advantageously formed by the vapor deposition techniques. Broadly, two methods are available for the vapor deposition; the chemical vapor deposition method which utilizes chemical reactions and physical vapor deposition method which effects the deposition by physical phenomena. A method blending these two methods can be used when necessary. In the chemical vapor deposition method, heated carbon fiber is exposed to a reactant gas mixture containing a compound of the corresponding carbide-forming metal element, a carbon compound and hydrogen gas. This permits the formation of a film of carbide on the surface of each filament in the carbon fiber.

The deposition of the film on the carbon fiber by the chemical vapor deposition method will be described specifically. In a reactor chamber from which air is excluded, yarn or bundle of carbon fiber held in a straight form is heated to a required temperature and exposed to a gas mixture containing the compounds of required elements. Although the optimum heating temperature depends on the kind of carbon fiber to be coated, the composition of the film, and other factors, it is generally desired to fall in the range of from 800° C. to 1800° C. As the compound containing the metal element forming the carbide, $SiCl_4$, $CH_3SiCl_3$, $(CH_3)_2SiCl_2$, $BCl_3$, $TiCl_4$, $ZrCl_4$, $WCl_6$, $NbCl_5$ and $TaCl_5$ can be used and as carbon source of the carbide, methane, propane, toluene and other low-molecular-weight hydrocarbons and carbon tetrachloride, chloroform and other halogen-containing carbon compounds can be used. In addition to these metal and carbon source compounds, hydrogen is often poured into the gas as the reducing agent, and inert gas e.g. argon or helium as the balance.

The carbide forming reaction is expressed by the following equation:

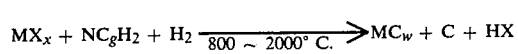  (1)

$$MX_x + NC_gH_2 + H_2 \xrightarrow[800 \sim 2000° C.]{} MC_w + C + HX$$

wherein, M is one member selected from the group consisting of Si, Ti, Zr, B, W, Nb, and Ta, X is one member selected from the group consisting of Cl and H, and w, x, y, and z each are a positive integer. But, since the reaction does not necessarily follow this equation stoichiometrically, the reaction condition such as temperature, composition of the reactant gas mixture and flow rate of the gas mixture should be determined specifically in practice. The content of free carbon in the coated film can be regulated by suitably choosing the concentration of the carbon containing compound in the reaction gas mixture, and controlled also by suitably choosing the concentration of hydrogen in the gas mixture. When titanium carbide is deposited at 1100° C., for example, the free carbon content is 50 weight percent in the film deposited from the reaction gas mixture in where the molar ratio of $TiCl_4:CH_4:H_2$ in the gas mixture is fixed at 1:1:0, and is zero weight percent in the film deposited from the reactant gas in where the molar ratio of those is fixed at 1:1:100.

By suitably changing the mixing ratio in the reaction gas as described above, an inner-layer film having the desired carbon content can be deposited directly on the surface of the carbon fiber. Then, a carbide outer-layer film is deposited on the free carbon containing inner-layer film in a similar manner to that in the case of the inner-layer film, but different in composition of the reactant gas mixture. Otherwise, the outer-layer film can be formed by exposing the inner-layer coated carbon fiber at high temperatures to a gas mixture containing the same components as in the case of the inner layer but absence of carbon source or containing this in the deficient amount to form carbide in the vapor phase. In this case, the outer-layer film of carbide is formed by a reaction of the free carbon in the outer part of the inner-layer with the elemental metal which is formed from the metal halogenide in the gas mixture by reducing with hydrogen. This reaction is expressed by the formula (2)

$$MX_x + C \text{ (free carbon)} + H_2 \rightarrow MC_w + HX \quad (2)$$

The case wherein the free metal still remains in the outer-layer up to 50 weight percent does not deviate from the scope of this invention.

The outer-layer film in the duplex film coated carbon fiber of the present invention is intended to prevent the carbon fiber from reaction with the matrix metal or ceramics or with air, and improve the adhesion ability of the carbon fiber to the matrix. To fulfill all these requirements, the inner-layer film is desired to have a thickness of 5 to 0.2 times that of the outer-layer film. When the inner-layer film is thicker than this, the outer-layer film becomes relatively thinner so that the duplex coated carbon fiber exhibits relatively poor resistance to reaction considering the total thickness of the duplex film. On the other hand, when the inner-layer film is thinner than this, it fails to manifest effectively an ability to prevent propagation of cracks from the outer layer. The total thickness of the inner and outer films is desired to fall in the range of 0.01 to 3 $\mu m$. When the thickness is smaller than the lower limit, the film may fail to coat the carbon fiber completely and may offer incomplete prevention of the reaction between the carbon fiber and the metal. When the thickness is greater than the upper limit, the coated carbon fiber suffers from insufficient flexibility.

As is clear from the description given above, the present invention keeps the carbon fiber from direct contact with metal by coating on it a composite film consisting of an inner-layer film formed of a mixture of free carbon with a metal carbide and an outer-layer film formed of a metal carbide. Thus, the duplex film prevents the carbon fiber from the otherwise possible degradation due to the reaction thereof with a metal. The cracks occurring in the outer-layer film are believed to be prevented from further growth by the free carbon contained in the inner-layer film. Consequently, the produced carbon fiber enjoys improved specific strength, specific elastic modulus, and thermal resistance even in a metal or ceramics matrix at high temperatures.

Now, the present invention will be described specifically with reference to working examples. These examples are solely intended to illustrate this invention and should not be construed as limiting the invention in any respect.

EXAMPLE 1

A yarn formed of 3000 filaments of polyacrylonitrile (PAN) based carbon fiber (314 Kg/mm$^2$ of strength) was held in position in an innert gas in an alumina reaction tube and heated at 1200° C. Then, a mixed gas consisting of 1.4 ml/min. of $CH_3SiCl_3$ reduced to one atmosphere), 250 ml/min. of Ar and 4 ml/min. of $H_2$ let flow at that temperature, and the yarn was coated with a film having a thickness of 0.1 μm and consisting of 10 weight percent of free carbon and 90 weight percent of silicon carbide. Subsequently, a mixed gas consisting of $CH_3SiCl_3$ and Ar at the same flow rates as used above and 10 ml/min. of $H_2$ gas let flow thereover to deposit thereon a film (0.1 μm) solely of silicon carbide. Consequently, a duplex film about 0.2 μm in thickness was formed on the individual filaments. The duplex film coated carbon fiber obtained had a strength of 363 Kg/mm$^2$.

For the purpose of comparison, the same yarn as used above was heated to 1200° C. A mixed gas consisting of 1.4 ml/min. (reduced to one atmosphere) of $CH_3SiCl_3$, 250 ml/min. of Ar, and 10 ml/min. of $H_2$ was passed on the heated yarn to deposit on the individual filaments a film (0.2 μm) solely of silicon carbide. The yarn coated with the single film had a strength of 190 Kg/mm$^2$, a value far lower than the strength of the carbon fiber itself.

Each of the coated yarns were each cut to a length of 3 mm, heated in air at a temperature increasing rate of 10° C./min. and analyzed thermogravimetrically. In both cases the temperature at which they began to lose their weight was found to be 300° C. higher than that of the untreated yarn. And the duplex film coated fiber possessed the same degree of resistance to oxidation as that of the fiber coated with the single film of silicon carbide.

EXAMPLE 2

A yarn formed of 3000 filaments of high-strength carbon fiber (314 Kg/mm$^2$ of strength) produced from polyacrylonitrile was held in position in an inert atmosphere in a alumina reaction tube heated at 1100° C. By holding the yarn in a flow of mixed gas consisting of 2 ml/min. of $SiCl_4$, 7 ml/min. of $CH_4$, and 100 ml/min. of Ar, the yarn was coated with a film, 0.1 μm in thickness, consisting of titanium carbide containing 72 weight percent of free carbon. Subsequently, by holding the yarn in a flow of a mixed gas consisting of 2 ml/min. of $TiCl_4$ and 100 ml/min. of $H_2$, the yarn was coated with an outer-layer film 0.05 μm in thickness. This coated yarn showed a strength of 322 Kg/mm$^2$. The yarn was cut to a length of 3 mm, heated in air at a temperature increasing rate of 10° C./min., and analyzed gravimetrically. The results were compared with those obtained for the untreated yarn. The comparison showed that the weight-loss (by oxidation) starting temperature of the carbon fiber becomes higher by 100° C. by the coating.

EXAMPLE 3

The same yarn of carbon fiber as used in Example 1 was held in position in an inert atmosphere in a alumina reaction tube heated at 1100° C. By holding the heated yarn in a flow of a mixed gas consisting of 2 ml/min. of $ZrCl_4$, 4 ml/min. of $CH_4$, 20 ml/min. of $H_2$, and 100 ml/min. of Ar, the yarn was coated with a film, 0.03 μm in thickness, consisting of zirconium carbide containing 61 weight percent of free carbon. Then, by holding the yarn in a flow of a mixed gas consisting of the same components but at the flow rate of hydrogen increased to 100 ml/min., there was formed an upper-layer film of zirconium carbide 0.1 μm in thickness. The carbon fiber coated with the duplex film as described above showed a strength of 309 Kg/mm$^2$. The weight-loss (by oxidation) starting temperature of the coated fiber found from the weight-heat curve was 150° C. higher than that of the untreated fiber.

EXAMPLE 4

A yarn formed of 6000 filaments of graphitized carbon fiber (204 Kg/mm$^2$ of strength) produced from polyacrylonitrile was held in position in a graphite reaction tube heated at 1100° C. By holding the yarn in a flow of a mixed gas consisting of $BCl_3$, $CCl_4$, and $H_2$, the yarn was coated with a film, 0.05 μm in thickness, consisting of boron carbide containing 8 weight percent of free carbon. Then, by holding the yarn in a flow of a mixed gas containing a decreased proportion of $TiCl_4$, the yarn was coated with an upper-layer film of boron carbide 1 μm in thickness. The yarn thus coated with the duplex film retained the original strength of the yarn. The weight-loss (by oxidation) starting temperature of this yarn was higher by 80° C. than that of the untreated yarn.

EXAMPLE 5

A yarn formed of 2000 filaments of graphitized carbon fiber (218 Kg/mm$^2$ of strength) produced from mesophase pitch was held in position in an alumina reaction tube heated at 1200° C. By exposing the yarn to a flow of mixed gas consisting of $WCl_6$, $CHCl_3$, and $H_2$, the yarn was coated with a film, 0.1 μm in thickness, consisting of tungsten carbide containing 21 weight percent of free carbon. Then, by sweeping the yarn with a mixed gas containing a decreased proportion of $CHCl_3$, the yarn was coated with an upper-layer film of tungsten carbide 0.05 μm in thickness. The yarn coated with the duplex film as described above showed a strength of 207 Kg/mm$^2$. The weight-loss (by oxidation) starting temperature of this yarn was higher by 200° C. than that of the untreated yarn.

EXAMPLE 6

A yarn formed of 6000 filaments of graphitized carbon fiber (204 kg/mm$^2$ of strength) produced from polyacrylonitrile was held in position in an alumina reaction tube heated at 1300° C. By exposing the yarn to a flow of a mixed gas consisting of $NbCl_5$, $CCl_4$, and $H_2$, the yarn was coated with a film, 0.2 μm in thickness, consisting of niobium carbide containing free carbon. Then by exposing the yarn to a flow of a mixed gas containing a decreased proportion of $CCl_4$, the yarn was coated with an upper-layer film of niobium carbide 0.05 μm in thickness. The yarn coated with the duplex film thus obtained showed strength approximating the original strength of the carbon fiber used as the raw material. The weight-loss (by oxidation) starting temperature of the yarn was higher by 80° C. than that of the untreated yarn.

EXAMPLE 7

The same yarn of carbon fiber as used in Example 6 was similarly heated. By exposing the heated yarn with a mixed gas consisting of $TaCl_5$, $C_3H_8$, and $H_2$, the yarn was coated with a film, 0.05 μm in thickness, consisting of tantalum carbide containing free carbon. Then, by exposing the yarn with a mixed gas containing an increased proportion of hydrogen, the yarn was coated with an upper-layer film of tantalum carbide 0.1 μm in thickness. The yarn coated with the composite film thus obtained showed strength approximating the original strength of the carbon fiber used as the raw material. The weight-loss (by oxidation) starting temperature of this yarn was higher by 120° C. than that of the untreated yarn.

EXAMPLE 8

The same yarn of carbon fiber as used in Example 6 was similarly heated. By exposing this heated yarn to a flow of a mixed gas consisting of $CH_3SiCl_2$, $TiCl_4$, $H_2$, and Ar, the yarn was coated with a film, 0.2 μm in thickness, consisting of 30 weight percent of free carbon, 20 weight percent of silicon carbide, and 20 weight percent of titanium carbide. Then, by exposing the yarn to a flow of a mixed gas containing an increased proportion of hydrogen, the yarn was coated with an upper-layer film, 0.2 μm in thickness, consisting of 30 weight percent of silicon carbide and 70 weight percent of titanium carbide. The yarn coated with the composite film thus obtained showed strength approximating the original strength of the carbon fiber used as the raw material. The weight-loss (by oxidation) starting temperature of this yarn was higher by 150° C. than that of the untreated yarn.

What is claimed is:

1. A uniaxially aligned carbon fiber coated with a duplex film consisting of an inner-layer film containing free carbon and metal carbide at a weight ratio in the range from 95:5 to 5:95 and an outer-layer film substantially solely of metal carbide, the total thickness of the inner-layer film and the outer-layer film being in the range of 0.01 to 3 μm, the thickness ratio of said inner-layer film to said outer-layer film falling in the range of 5:1 to 1:5.

2. The carbon fiber according to claim 1 wherein the carbon fiber to be coated with the duplex film has a tensile strength of at least 180 Kg/mm².

3. The carbon fiber according to claim 1 wherein the metal carbide is a carbide of at least one member selected from the group consisting of silicon, boron, titanium, zirconium, niobium, tungsten, and tantalum.

4. A method for the manufacture of a uniaxially aligned carbon fiber coated with a duplex film which method comprises the steps of heating the carbon fiber to be coated to a temperature in the range of 800°–1800° C. in an inert atmosphere, feeding a mixed gas containing a compound containing a carbide-forming metal, a carbon containing compound, and hydrogen gas into contact with the heated carbon fiber thereby depositing on the carbon fiber (a) an inner-layer film of a mixture of free carbon and a metal carbide, and then feeding a mixed gas containing a carbon compound, a metal compound, and hydrogen into contact with the coated carbon fiber thereby depositing on said inner-layer film an outer-layer film of a metal carbide, the total thickness of said inner-layer film and said outer-layer film being in the range of 0.01 to 3 μm.

5. The method according to claim 4 wherein the carbide-forming metal compound is one member selected from the group consisting of $SiCl_4$, $CH_3SiCl_3$, $(CH_3)_2SiCl_2$, $TiCl_4$, $BCl_3$, $ZrCl_4$, $WCl_6$, $NbCl_5$, and $TaCl_5$.

6. The method according to claim 4 wherein the carbon containing compound is a low-molecular hydrocarbon or a halogen-containing carbon compound.

7. The method according to claim 4 wherein the free carbon content in the mixed film is adjusted by regulating the amount of hydrogen added.

8. A method of the manufacture of a uniaxially aligned carbon fiber coated with a duplex film, which method comprises the steps of heating the carbon fiber to be coated to a temperature in the range of 1000°–1500° C. in an inert atmosphere, feeding a mixed gas containing a compound containing a carbide-forming metal and hydrogen into contact with the heated carbon fiber thereby forming on the carbon fiber (a) an inner-layer film of a mixture of free carbon with a metal carbide, and then feeding a mixed gas containing an organic metal compound and hydrogen into contact with the coated carbon fiber thereby depositing on said inner-layer film an outer-layer film of a metal carbide, the total thickness of said inner-layer film and said outer-layer film being in the range of 0.01 to 3 μm.

9. The method according to claim 8 wherein the carbide-forming metal compound is one member selected from the group consisting of $SiCl_4$, $CH_3SiCl_3$, $(CH_3)_2SiCl_2$, $TiCl_4$, $BCl_3$, $ZrCl_4$, $WCl_6$, $NbCl_5$, and $TaCl_5$.

10. The method according to claim 8 wherein the free carbon content in the mixed film is adjusted by regulating the amount of hydrogen added.

* * * * *